(12) United States Patent
Hong et al.

(10) Patent No.: US 7,106,757 B2
(45) Date of Patent: Sep. 12, 2006

(54) SYSTEM AND METHOD FOR STREAMING MULTIMEDIA OVER PACKET NETWORKS

(75) Inventors: Jiang Hong, San Jose, CA (US); Igor V. Kozintsev, San Jose, CA (US); Marco Y. Wirasinghe, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 960 days.

(21) Appl. No.: 10/028,854

(22) Filed: Dec. 19, 2001

(65) Prior Publication Data

US 2003/0112822 A1  Jun. 19, 2003

(51) Int. Cl.
*H04J 3/16* (2006.01)
*H04J 3/24* (2006.01)

(52) U.S. Cl. ...................... 370/469; 370/474
(58) Field of Classification Search ............. 370/395.1, 370/395.42, 395.43, 412, 413, 465, 466, 370/469
See application file for complete search history.

(56) References Cited

U.S. PATENT DOCUMENTS

| | | | | |
|---|---|---|---|---|
| 5,365,272 | A * | 11/1994 | Siracusa | 375/240.25 |
| 5,652,749 | A * | 7/1997 | Davenport et al. | 370/466 |
| 5,966,385 | A * | 10/1999 | Fujii et al. | 370/465 |
| 6,157,653 | A * | 12/2000 | Kline et al. | 370/412 |
| 6,594,276 | B1 * | 7/2003 | Le | 370/465 |
| 2002/0006136 | A1 * | 1/2002 | Mallory et al. | 370/466 |
| 2002/0031086 | A1 * | 3/2002 | Welin | 370/229 |
| 2002/0064169 | A1 * | 5/2002 | Gummalla et al. | 370/412 |
| 2002/0163932 | A1 * | 11/2002 | Fischer et al. | 370/465 |
| 2005/0169180 | A1 * | 8/2005 | Ludwig | 370/231 |
| 2005/0190763 | A1 * | 9/2005 | Tomita | 370/389 |

FOREIGN PATENT DOCUMENTS

| | | |
|---|---|---|
| EP | 1 113 644 A2 | 7/2001 |
| WO | WO 00/72601 A2 | 11/2000 |
| WO | WO 01/52466 A1 | 7/2001 |

OTHER PUBLICATIONS

2000 IEEE, "Optimal Scheduling for Stremaing of Scalable Media", Z. Miao, et al., 3 pages.
XP-002233486, "Quality of Service in Bluetooth Networking", M. van der Zee, et al., 56 pages.
2000 IEEE, "Selective Truncating Internetwork Protocol: experiments with explicity framing", M. Engan, et al., 3 pages.
XP-008006103, "MPEG-4 FGS Video Streaming with Constant-Quality Rate Adaptation, Prioritized Packetization and Differentiated Forwarding", L. Zhao, et al., 6 pages.

* cited by examiner

*Primary Examiner*—Seema S. Rao
*Assistant Examiner*—Kevin Mew
(74) *Attorney, Agent, or Firm*—Sharmini N. Green

(57) ABSTRACT

A data transmission method and protocol includes progressive coding of a data set into time stamped data packets. The packets are ordered in importance, with some packets being more critical to received data quality than other packets from the same source. If packets are delayed in transit from a source to a receiver, packets of lesser importance are discarded after a set time, a transmission and decoding of a second set of time critical data begins.

13 Claims, 6 Drawing Sheets

Cumulative Quality

Amount of data decoded

SYSTEM AND METHOD FOR STREAMING MULTIMEDIA OVER PACKET NETWORKS

FIELD OF THE INVENTION

The present invention relates to computer network transmission of encoded data. More particularly, the present invention relates to improved transmission protocols for handling streamed multimedia data.

BACKGROUND OF THE INVENTION

Distribution of packet ordered multimedia data often requires use of an intermittently unreliable communication channel. For example, radio based wireless communication channels are often subject to radio interference from other radio spectrum emitting devices, while wired network communication channels are prone to network congestion. Both radio interference and network congestion can result in loss of data during transmission.

To compensate for data loss, two major classes of communication protocols are used to communicate data over packet networks. The first class of communication protocols is termed "synchronous", and uses a fixed delay transmission of packets. To mitigate the effect of channel errors a suitable error correcting code scheme such as Forward Error Control (FEC) coding is often employed. A data message is transformed by an FEC operation into a codeword of bigger size that ensures that if a number of altered components (through transmission error) of a codeword are below some designed threshold, the original data can still be correctly extracted. In effect, FEC provides error resilience by increasing the amount of data to be sent over a communication channel. Such synchronous transmission does not require a return channel, but there is no guarantee that the data will arrive to the receiver without errors.

As an alternative, it is possible to use packet based asynchronous communication protocols that are reliable, but have unbounded delay for packet delivery. Automatic Repeat Request (ARQ) is a popular example of such protocol. It operates by dividing the data into packets and appending a special error check sequence such as a Cyclic Redundancy Check (CRC) code to each packet for error detection purpose. The data packets and error checks are communicated over a channel and the receiver decides whether a transmission error occurred by calculating the check sequence and comparing it to the one it received. If a discrepancy is found the error is declared and the receiver requests the transmitter to resend the packet using the return channel. For each data packet in the forward channel, the receiver transmits either a positive Acknowledgment (ACK) packet or a negative one (NACK). In contrast to the synchronous transmission techniques, ARQ requires a two-way communication channel to be present. Often, the return channel uses the same physical medium as the forward channel. So effectively ARQ also expands the data size because of retransmissions and communication of control information. The difference from the synchronous FEC-based protocols is, however, that ARQ is inherently channel adaptive since only lost packets are resent, while FEC adds overhead to all packets. On the other hand, for some packet networks such as the Internet, ARQ may introduce significant delays due to roundtrip propagation time and processing time, which limit the application of ARQ to real-time multimedia communications.

Unfortunately, conventional synchronous and asynchronous protocols are not well suited for transmitting streaming multimedia data. In real-time applications, multimedia data cannot tolerate unbounded delays. If data for a video frame arrives after its deadline in real-time applications, it has to be discarded. This suggests that common asynchronous protocols are not suited for real-time multimedia. Use of synchronous protocols presents significant difficulties as well. Because of the bandwidth limitations of conventional wireless and wired communication channels, multimedia data is compressed for transmission. Such compressed data cannot tolerate frequent errors in the transmission. In many cases, certain portions of compressed multimedia (headers, important coding information, etc.) data are intolerable to errors at all. This renders synchronous protocols inapplicable for many multimedia communication scenarios.

BRIEF DESCRIPTION OF THE DRAWINGS

The inventions will be understood more fully from the detailed description given below and from the accompanying drawings of embodiments of the inventions which, however, should not be taken to limit the inventions to the specific embodiments described, but are for explanation and understanding only.

DETAILED DESCRIPTION OF THE INVENTION

Figure 1:
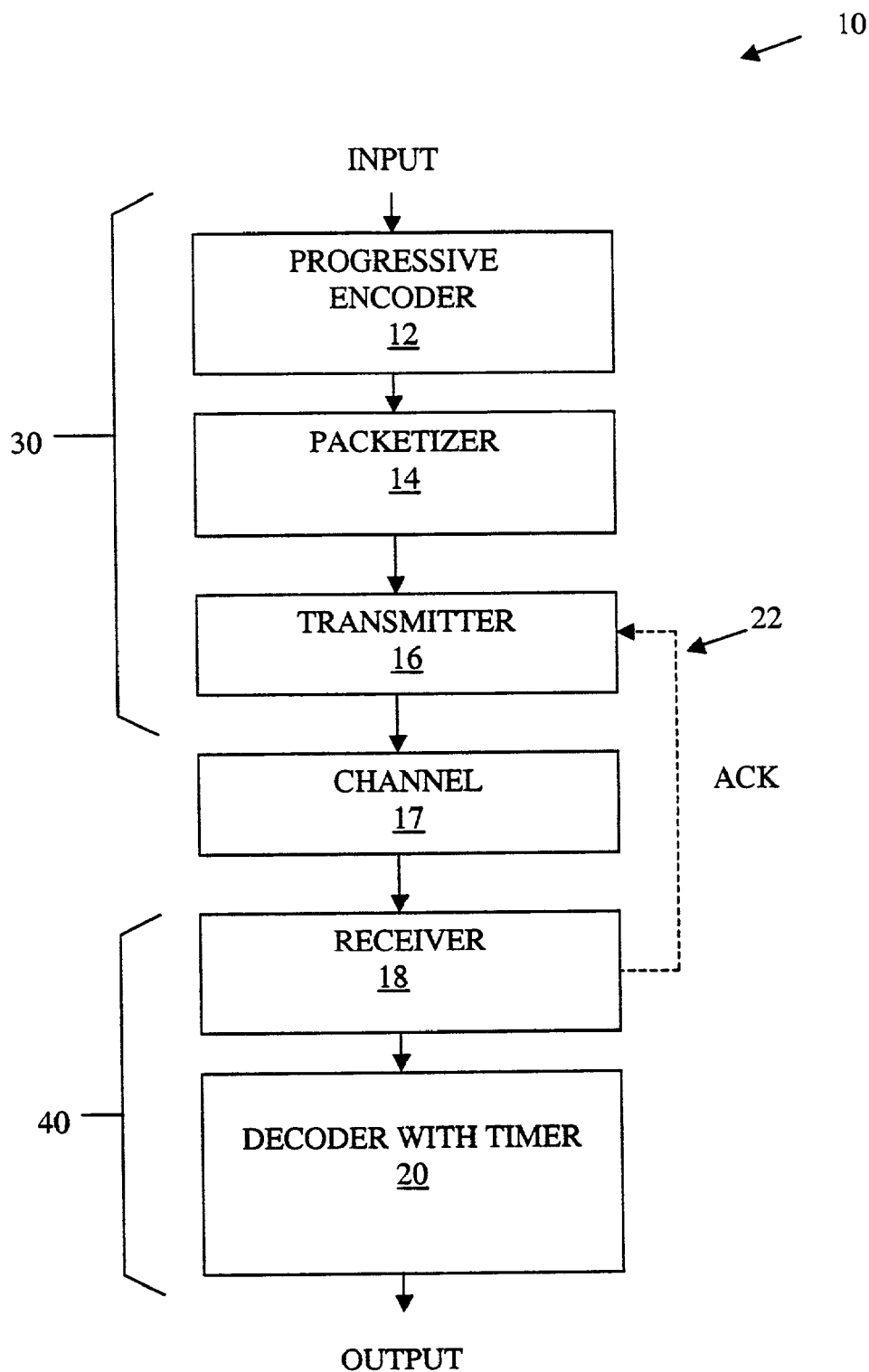
FIG. 1 illustrates a system for encoding, transmitting, receiving, and decoding digital information.

As seen with respect to the block diagram of FIG. 1, the present invention is a system 10 that provides reliable transmission of coded data between a data server 30 and a client 40 over an intermittently unreliable communication channel. The communication channel can be wired or wireless, and can utilize commonly available packet based control and transmission protocols, including those based on TCP/IP or Bluetooth. In preferred embodiments, the system 10 can transfer any progressively encoded media data (including image, audio, video, etc) with real time delivery quality of service requirements.

Typically, the input signal includes video data such as MPEG2, MPEG4, JPEG, Motion JPEG, or other sequentially presentable transform coded images. Because of the substantial data volume of uncompressed video streams, standard discrete cosine transform based quantization can be used for signal compression, although other compression schemes may also be used. In the illustrated embodiment, the input video signal is fed into a progressive encoder 12 of the data server 30, which converts the signal into video data in the form of a machine-readable series of bits, or bitstream. This video data can be stored on a server pending a request for the video data from a client 40. When video data, is requested, the data is packetized by a packetizer 14 and then processed by a transmitter 16 for transmission on a wired or wireless communication channel 17. Typically the communication channel is an asynchronous packet network that uses acknowledgement (ACK) commands 22 to notify a server of receipt by a client of data. A receiver 18 receives the transmitted data and sends it as a bitstream to a decoder 20. The decoder 20 converts the received bitstream into an output signal, which may then be viewed.

As will be understood, although not required, the video data is indefinitely stored in data server 30, awaiting a transaction request for the data by a client 40. Typically a client is an application which requests resources, such as the video data, from the server. When a client makes a request to the source 30 for the video data along a communication channel supported by a network, a processor in the data server determines the amount of bandwidth on the network. Available bandwidth can be dynamically determined, directly allotted by the server or the client, or created on demand based on information provided by the client.

To maximize usage of this available bandwidth and permit selective data deletion in accordance with the present invention, the encoding done in progressive encoder 12 typically involves multilevel lossy transform/quantization based compression techniques such as MPEG-4. Such progressive encoding greatly differs from traditional source coding technique using a fixed rate coding or single layer coding method, whereas data compression is optimized for a target bandwidth or a target storage size. While such traditional coding techniques provide high compression ratios, they also introduce high interdependency. Consequently, small bit error in the compressed data due to unreliable transmission may render as significant artifacts after the compressed data being decoded. This type of single layer coding method works fine for application domains such as VCD/DVD applications where certain media storage size is targeted, or cable/satellite broadcasting applications where dedicated bandwidth is assigned to each data channel. However, it does not fit well for packet networks where both bandwidth and latency cannot be guaranteed.

Figure 2:
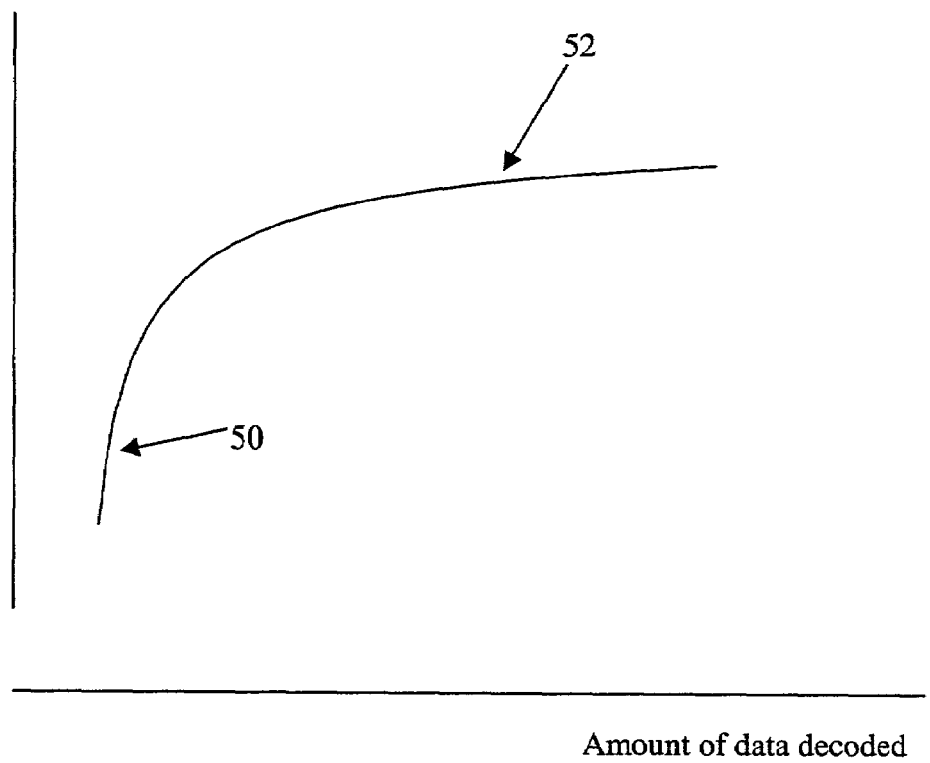
FIG. 2 is a graph illustrating quality improvement consequent to receipt of increasing amounts of progressively coded data.
Figure 2:
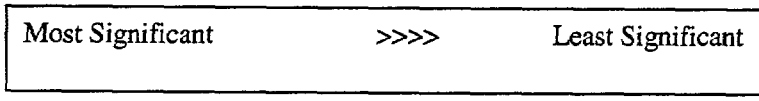

Progressive coding is also known as "scalable coding" or "multilayer coding". In progressive coding, data is divided into coding units (e.g., a video or audio frame) and within those units the data is arranged such that the most important part is placed in the beginning followed by the parts having successively lower importance. The decoding of the data within a coding unit can be partial and the more data is decoded, the better the quality of the information. This is graphically illustrated in FIG. 2, which schematically illustrates increasing quality (steep sloping line 50) for following receipt of the most significant data, with lesser quality improvements (line 52) as less significant data is received by a client. Decoding of the first part of the data may or may not be required to decode the following portions of the data inside a coding unit. Therefore, a single progressively coded multimedia data can be served over a dynamic network where the bandwidth may vary from time to time for a given receiver or vary from one receiver to other receivers.

For example, progressive coding of video data involves division into coding units (e.g., a video frame) and within those units the data is arranged such that the most important part is placed in the beginning followed by the parts having successively lower importance. The decoding of the data within a coding unit can be partial and the more data is decoded, the better the quality of the information is. Decoding of the first part of the data may or may not be required to decode the following portions of the data inside a coding unit. In multi-layer coding schemes, the first part of the data is called the base layer and the following portions of the data are called enhancement layers. In effect, a base layer sufficient to permit generation of a viewable video sequence of lesser quality than is represented by the source video sequence is created. The base layer comprises a low-bandwidth version of the video sequence. If it were to be decoded and viewed, the base layer would be perceived as an inferior version of the original video. Enhancement techniques at the client compensate for the missing data and produce a smooth and aesthetically pleasing output video. While various techniques can be used to augment the base layer video quality, one simple technique simply requires capturing the difference between a quantized/truncated base video picture and an original unquantized input video picture to make one or more enhancement layers to be transmitted in addition to the base layer.

Enhancement layers enhance the quality of the viewable video sequence generated from the base layer. Combining the base layer with a single enhancement layer at the client produces a correction to the video data and an improved output video. Combining an additional enhancement layer provides additional correction and additional improvement. Combining the base layer with all enhancement layers at the receiving end will result in a video output of quality nearly equal to the original input video. According to MPEG-4, each enhancement layer would typically be one "bit slice" or "bit plane" of the difference data. In such an arrangement, each enhancement layer for each picture would consist of a series of bits. The enhancement layers are ordered in such a way that the first enhancement layer would contain the most significant bits, the second enhancement layer would contain the next most significant bits, and so on. This means that the most significant correction would be made by the first enhancement layer. Combining more enhancement layers would continue to improve the output quality. In this way, the quality of the output video can be "scaled" by combining different numbers of enhancement layers with the base layer. The process of using fewer or more enhancement layers to scale the quality of the output video is referred to as "Fine Granularity Scalability" or FGS. FGS may be employed to produce a range of quality of output video, with a viewer who receives data having more enhancement layers along a channel having a larger bandwidth being able to view output video of better quality than a viewer who receives data having fewer enhancement layers along a channel having a smaller bandwidth.

Figure 3:
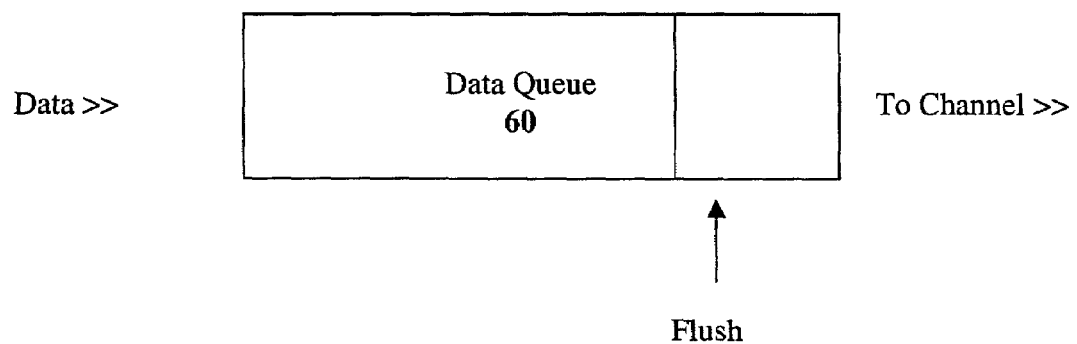
FIG. 3 illustrates a data queue for holding packet data for a predetermined time period.

As seen with respect to FIG. 3, given progressively coded data, the present invention balances the desire to have as complete a set of data as possible against physical timing constraints due to network bandwidth deficiencies using a flushable data queue. As depicted in FIG. 3, the coding units are put into a data queue 60. A coding unit contains portions of media data having the same deadline and encoded using a progressive coding method. For example, a coding unit for video data may contain a portion of video frame, a video frame, or multiple video frames. The size of each coding unit is chosen to maintain the average quality level. Typically, the transmission queue is a memory in a discrete or integrated communication device and a memory on the host system. A data queue may contain data packets from one or more coding units. Once one or more data packets are transferred into the queue the asynchronous transmission of data packets begins. More important data is sent before the less important data. If all data packets belonging to one coding unit are completely transferred before the designated deadline for the coding unit expires, then data packets for the next coding unit (if available) may go into transmission from the queue. In case the deadline expires before all data packets for one coding unit are transferred, the "flush" command is issued that interrupts the transmission and removes the remaining data packets belonging to the same coding unit from the data queue. The "flush" command may be issued either by the host software or by other mechanisms. After this, data packets for the next coding unit may go into transmission.

Figure 4:
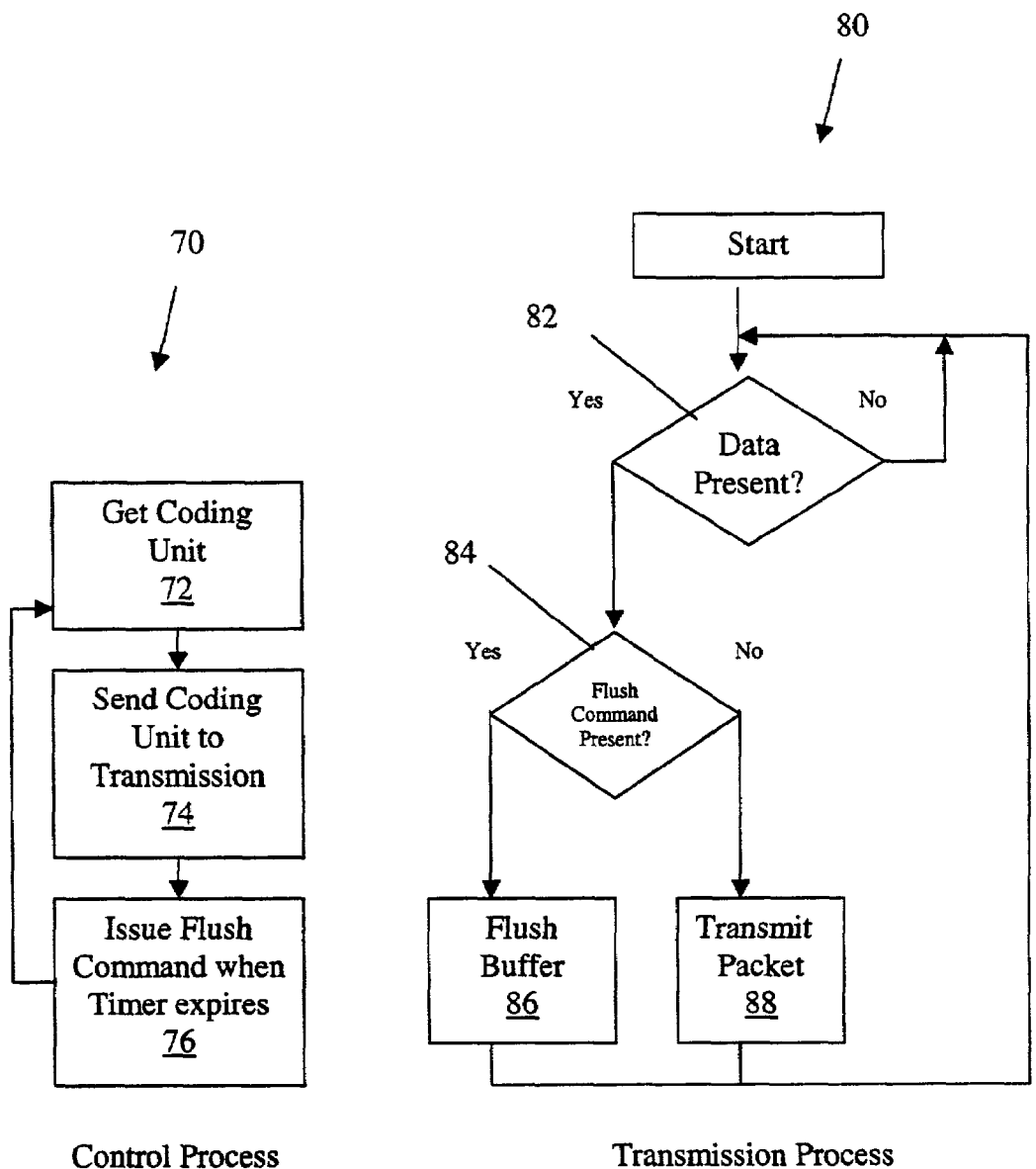
FIG. 4 respectively illustrates logic flow in a control process and transmission process for packet data.

The flushing procedure is better illustrated with respect to FIG. 4, which uses a server side control process 70 for getting a coding unit (block 72), sending the coding unit for transmission (block 74) and issuing a flush command upon expiration of a timer (block 76). The data is transmitted in accordance with the transmission process 80, which checks for presence of data in the data queue (block 82), and depending upon presence or absence of a flush command (block 84) either flushes the data queue buffer (block 86) or transmits the packet (block 88). As will be appreciated by those skilled in the art, with appropriate modifications the control procedure could be implemented on the client side, with a request to flush the server data queue being transmitted to the server over the network.

Figure 5:
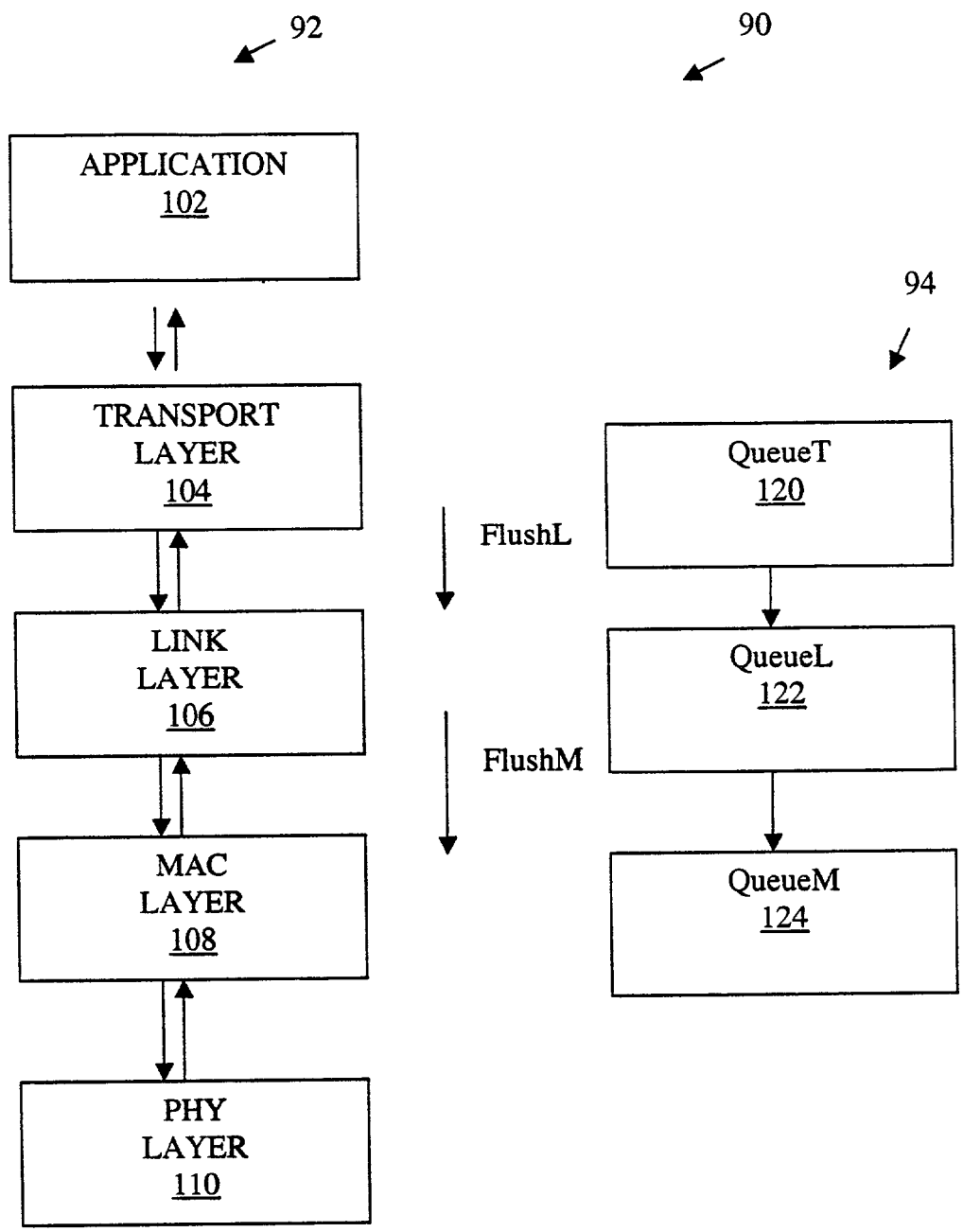
FIG. 5 illustrates flushing operations performed on a data protocol stack.

FIG. 5 is a logical diagram 90 illustrating in greater detail operation of the process of FIG. 4 using conventional OSI layered network protocol stack 92. In order for an application 102 at the top of layers to communicate with an application at another end point, control and data pass (typically) through the Transport Layer 104, Link Layer 106, Media Access Control (MAC) Layer 108 and Physical (PHY) Layer 110 before being transmitted over the physical media (which can be wired or wireless) to the other end point. QueueT 120, QueueL 122 and QueueM 124 denote data queues 94 at Transport Layer, Link Layer and MAC Layer, respectively. Some of those queues may be absent (or virtual) depending on a particular implementation. In existing packet network standards such as IEEE 802.11 wireless Local Area Network (LAN) or Bluetooth wireless Personal Area Network (PAN), protocols for MAC layer as well as PHY layer are standardized. In practice, protocols in these two layers are also hard to modify, as they are usually implemented in firmware and/or hardware. Link Layer may also be standardized. However, since it is mostly implemented in host software, some levels of modification may be acceptable. To fit the above progressive media transport method in the existing packet networks, implementation of the protocol at the Transport Layer 104 is preferred.

The Transport Layer 104 is responsible of packetizing data into coding units. One coding unit may comprise one or more transport data packets. All data packets in one coding unit have the same timestamp, which is part of the packet header. For example, if a coding unit for video data is a portion of video frame or a video frame, the timestamp may be the relative presentation time of the video frame. If a coding unit contains a group of consecutive video frames, the timestamp may be the relative presentation time of the first video frame in the group. Therefore, the timestamp can be used to identify all transport data packets belonging to the same coding unit. While further fragmentation may be applied at the Link Layer 106 and the MAC Layer 108, the timestamps are unaltered and typically remain available to each layer management. The Transport Layer 104 also maintains a master clock that is used to compare with the timestamps in the transport data packets to determine if the deadline is expired for a coding unit. When the deadline for a coding unit is expired, the Transport Layer 104 removes any remaining data packets with the same time stamp from QueueT. Meanwhile, if it determines that additional packets for the coding unit may be present in lower layers (Link and MAC layers), it issues command "FlushL" to the Link Layer 106. The flush command contains the timestamp associated with the coding unit or another information to identify the data at the Link Layer. Upon receiving a FlushL command, the Link Layer checks the status of its queue QueueL and removes any remaining packets with the same timestamp from QueueL. If it determines that additional packets for the coding unit may be present in the MAC Layer 108, it then issues command "FlushM" to the MAC Layer 108. FlushM, like FlushL, discards any remaining packets belonging to the coding unit from QueueM. Upon receiving a FlushM command, the MAC Layer 108 repeats the same operations described above for the Link Layer 106. For those packet networks that do not support targeted flush command at the MAC layer, the algorithm in the Link Layer 106 can be modified to issue a FlushM command to the MAC Layer 108 if the MAC Layer only contains packets for the targeted coding unit.

Figure 6:
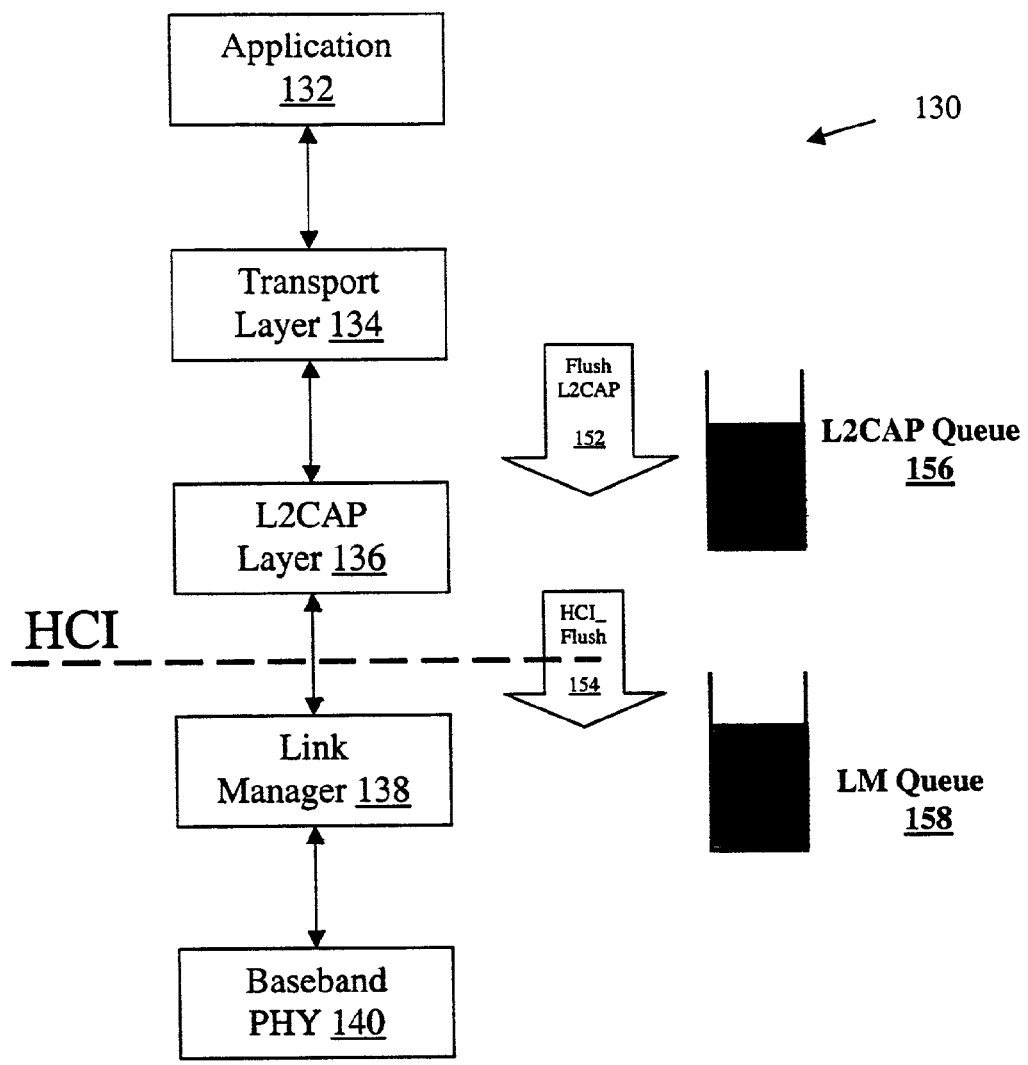
FIG. 6 illustrates an embodiment employing a modified Bluetooth protocol.

FIG. 6 shows a schematic flow diagram 130 of an embodiment suitable implementing this technique using Bluetooth wireless PAN standard. A typical Bluetooth stack contains the Application 132, the Transport Layer 134, the L2CAP (Logical Link Control and Adaptation Protocol) Layer 136, the Link Manager Layer 138, and the Baseband PHY Layer 140. L2CAP Queue 156 and LM Queue 158 denote data queues at the L2CAP Layer and Link Manager Layer, respectively. As shown in FIG. 6, the Transport Layer 134 provides time-based service for an Application 132 that initiates media streaming using Bluetooth wireless PAN connection. Once a data streaming connection is established with a remote device, an L2CAP channel in the L2CAP layer 136 is assigned to the data stream. The Transport Layer 134, such as an AVDTP (AudioNideo Distribution Transport Protocol) Layer, creates coding data units and packetizes them into Transport Packets. Transport Packets for a coding unit have the same timestamp and are arranged in a group. The maximum size of the Transport Packet created by the Transport Layer should not exceed MTU (Maximum Transmission Unit) specified by the L2CAP Layer 136. In addition, the Transport Layer 134 uses Bluetooth ACL (Asynchronous Connectionless) packets to deliver the data. The Transport Layer 134 also maintains a master clock.

In operation, the Transport Layer 134 passes one group of Transport Packets at a time to the L2CAP Layer 136. The L2CAP Layer 136 maintains its own queue 150, which is typically a virtual queue that contains only pointers to memory locations where Transport Packets are stored. Only pointers to Transport Packets are passed from the Transport Layer 134 to the L2CAP Layer 136. When the time for a given coding unit expires, the Transport Layer 134 issues a Flush Request 152 to the L2CAP Layer 136. Implementation of this Flush Request 152 requires modification of the standard L2CAP layer software. The purposes of the Flush Request are to remove all the data associated with the L2CAP channel from the L2CAP queue and to order the L2CAP layer to issue a standard HCI_Flush command 154 to the Link Manager 138. After this the group of Transport Packets for the next coding unit is transferred to the L2CAP Layer 136.

Upon receiving one or more Transport Packets from the Transport Layer 134, the L2CAP Layer 136 encapsulates Transport Packets into L2CAP packets for the given L2CAP channel and sends them to the Link Manager 138 using the standard HCI (Host Control Interface) interface. Upon receiving a Flush Request 152 for a L2CAP channel from the Transport Layer, the L2CAP layer removes any remaining packets associated with the L2CAP Channel from its queue and also issues the HCI_Flush command 154 to the Link Manager 138. Upon receiving a HCI_Flush command 154, the Link Manager 138 removes any remaining packets associated with the L2CAP Channel from its queue. This ensures that the remaining data of the coding unit with expired timestamp are removed from L2CAP queue and all the queues in the layers below it before transmission by the Baseband PHY Layer 140. Because the HCI_Flash command 154 removes all the data for the existing L2CAP channel, this algorithm transfers coding units one at a time to ensure that the flush only affects data that belong to a single coding unit.

The methods, encoders, and decoders described above can be stored in the memory of a computer system (e.g., set top box, video recorders, etc.) as a set of instructions to be executed. In addition, the instructions to perform the method, encoders, and decoders as described above could alternatively be stored on other forms of machine-readable media, including magnetic and optical disks. For example, the method of the present invention could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the methods, encoders, and decoders as discussed above, could be implemented in additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.); etc. Furthermore, the encoders and decoders as described above could be implanted on the same hardware component, such as a network controller that may or may not be integrated into a chipset device.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances "an embodiment," "one embodiment," or "some embodiments" are not necessarily all referring to the same embodiments.

If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Those skilled in the art having the benefit of this disclosure will appreciate that many other variations from the foregoing description and drawings may be made within the scope of the present invention. Accordingly, it is the following claims including any amendments thereto that define the scope of the invention.

What is claimed is:

1. A method of:
    encoding a data set into a plurality of coding units, with each coding unit being progressively encoded to sequentially present most significant data followed by less significant data;
    packetizing each of the plurality of coding units to provide transmissible data packets;
    marking by time stamping each transmissible data packet from the same coding unit to allow time based selective flushing of those data packets carrying less significant data; and
    flushing those queued time stamped transmissible data packets from a transport layer, a link layer, and a media access control (MAC) layer of a data handling protocol stack after a predetermined time if all transmissible data packets for the same coding unit are not transmitted within that predetermined time.

2. The method of claim 1, further comprising maintaining a data queue for temporarily holding coding units stored in the data queue as time stamped data packets having the same time stamps, and interrupting data packet transmission if data packets belonging to a coding unit in the data queue are not transmitted within a preset time period.

3. The method of claim 1, further comprising transmitting progressively coded transmissible data packets using an asynchronous reliable packet communication protocol.

4. The method of claim 1, further comprising transmitting progressively coded transmissible data packets over a wireless physical layer.

5. The method of claim 4, further wherein data packets are asynchronously transmitted using a connectionless protocol.

6. An article comprising a computer-readable medium, which stores computer-executable instructions, the instructions defined to cause a computer to:
    progressively code a data set into a plurality of coding units, with each coding unit carrying data sequentially arranged in order of importance, with most significant data being readable before less significant data,
    packetize each of the plurality of coding units to provide transmissible data packets, and
    mark by time stamping each transmissible data packet from the same coding unit to allow time based selective flushing of those data packets; and
    flush those queued time stamped transmissible data packets from a transport layer, a link layer, and a media access control (MAC) layer of a data handling protocol stack after a predetermined time if all transmissible data packets for the same coding unit are not transmitted within that predetermined time.

7. The article comprising a computer-readable medium which stores computer-executable instructions of claim 6, wherein the instructions further cause maintenance of a data queue for temporarily holding coding units as time stamped data packets having the same time stamps, and interrupting data packet transmission if data packets belonging to a coding unit in the data queue are not transmitted within a preset time period.

8. The article comprising a computer-readable medium which stores computer-executable instructions of claim 6, wherein the instructions further cause transmission of progressively coded transmissible data packets over a wireless physical layer.

9. The article comprising a computer-readable medium which stores computer-executable instructions of claim 6, wherein the instructions further cause encoding of image data using transform coding.

10. A digital transmission system comprising:
    an encoding unit to progressively code a data set into a plurality of coding units, with each coding unit carrying data sequentially arranged in order of importance, with most significant data being readable before less significant data;

a marking module to mark each transmissible data packet from the same coding unit, allowing time based selective flushing of those data sets;

a flushing module to selectively flush those data sets in a transport layer in a link layer, and in a media access control (MAC) layer of a data handling protocol stack; and a decoding module to decode transmitted data packets.

11. The digital transmission system of claim 10, further comprising a transmission queue for temporarily holding time stamped data packets having the same time stamps, and interrupting data packet transmission if the transmission queue is not filled within a preset time period.

12. The digital transmission system of claim 10, further comprising a wireless transmission unit to transmit progressively coded transmissible data packets over a wireless physical layer.

13. The digital transmission system of claim 10, further comprising a transform coding module for encoding image data.

* * * * *

UNITED STATES PATENT AND TRADEMARK OFFICE
CERTIFICATE OF CORRECTION

| | | |
|---|---|---|
| PATENT NO. | : 7,106,757 B2 | Page 1 of 1 |
| APPLICATION NO. | : 10/028854 | |
| DATED | : September 12, 2006 | |
| INVENTOR(S) | : Hong et al. | |

It is certified that error appears in the above-identified patent and that said Letters Patent is hereby corrected as shown below:

In column 8, line 41, delete "lime" and insert --time--.

Signed and Sealed this

Sixth Day of November, 2007

JON W. DUDAS
*Director of the United States Patent and Trademark Office*